(12) United States Patent
Lanz

(10) Patent No.: US 6,883,395 B2
(45) Date of Patent: Apr. 26, 2005

(54) GEARBOX SHIFT SYSTEM

(75) Inventor: Hermann Lanz, Frickingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/435,963

(22) Filed: May 12, 2003

(65) Prior Publication Data

US 2004/0007084 A1 Jan. 15, 2004

(30) Foreign Application Priority Data

Jul. 12, 2002 (DE) .......................... 102 31 609

(51) Int. Cl.$^7$ .............................................. F15H 63/00
(52) U.S. Cl. ........................... 74/335; 74/333; 74/334; 74/372; 74/373; 74/374; 74/375
(58) Field of Search ........................ 74/333, 334, 335, 74/372, 373, 374, 375

(56) References Cited

U.S. PATENT DOCUMENTS

| | | | |
|---|---|---|---|
| 3,827,276 A | * | 8/1974 | Willers ........................ 74/363 |
| 4,614,126 A | * | 9/1986 | Edelen et al. .................. 74/333 |
| 5,000,060 A | * | 3/1991 | Reynolds et al. .............. 74/745 |
| 5,309,782 A | * | 5/1994 | Seaman ........................ 74/359 |
| 5,704,251 A | * | 1/1998 | Alber et al. ............. 74/473.25 |
| 6,164,149 A | * | 12/2000 | Ohmori et al. ........... 74/336 R |

FOREIGN PATENT DOCUMENTS

| | | | |
|---|---|---|---|
| DE | 1 550 753 | 9/1971 | .............. F16H/3/08 |
| DE | 2 157 153 | 5/1972 | .............. F16H/5/08 |
| DE | 28 48 213 B2 | 3/1981 | .............. F16H/5/08 |
| DE | 43 24 264 C1 | 3/1995 | ........... F16D/23/04 |

* cited by examiner

Primary Examiner—Charles A. Marmor
Assistant Examiner—David D. Le
(74) Attorney, Agent, or Firm—Davis & Bujod, P.L.L.C.

(57) ABSTRACT

A transmission shift system for idler wheels comprising at least one actuating device that actuates a respective sliding sleeve non-rotatably connected with a main shaft in order to bring the sliding sleeve to positive fit with an idler wheel to be shifted. It is provided that the shiftable idler wheel is disposed upon the main shaft directly juxtaposed in axial direction and that the respective actuating devices are provided as unit on the main shaft outside the group of idler wheels, each actuating device being connected with the respective sliding sleeve via at least one connecting element extending along the main shaft.

19 Claims, 3 Drawing Sheets

_US 6,883,395 B2_

GEARBOX SHIFT SYSTEM

FIELD OF THE INVENTION

The invention concerns a transmission shift system for idler wheels.

BACKGROUND OF THE INVENTION

Transmission shift systems are known from the prior art. In an already known transmission shift system, the shifting operation results by axial displacement of sliding sleeves. The sliding sleeve concerned can thereby positively connect an idler wheel to be shifted with a main shaft. In the known transmission shift systems, the displacement of the sliding sleeve is carried out by an actuating device which comprises a shift fork provided between the idler wheels to be shifted. The respective arrangement of the shift fork between the idler wheels has among others the disadvantage that the space between the idler wheels is relatively large in order to make possible placing the respective shift fork.

Dimensions of the main shaft are accordingly increased by said space in each shift set. A relatively great length thus results, for example, for a countershaft transmission. Besides, the countershaft must also be designed correspondingly longer by said space. In addition, the dimensions of the shift rails used, which for assembly and standardization reasons, in general, must have identical lengths, are disadvantageously increased.

The problem on which this invention is based is proposing a transmission shift system of the kind mentioned above which implements the smallest possible total length of the transmission.

SUMMARY OF THE INVENTION

An inventive transmission shaft system is proposed in which the idler wheels are disposed upon the main shaft directly juxtaposed in axial direction. The actuating device concerned is advantageously provided as unit centrally on a place on the main shaft, preferably outside the group of idler wheels, each actuating device being connected with the appertaining sliding sleeve by at least one connecting element that extends along the main shaft. The total length of the transmission is thereby reduced, since almost no space is any longer required between the individual idler wheels. Based on the known transmission shift systems, the length can be shortened by an amount of substantially 18 mm.

Besides, the length of each countershaft of the transmission is only determined by the width of the teeth which positively affects the total length. In addition, the shift rails, which actuate the respective shift fork, can also be designed very short with regard to length.

Within the scope of a development of the invention, it can be provided that the sliding sleeves be associated with one idler wheel or several idler wheels. The sliding sleeve concerned is preferably provided in radial direction between the main shaft and the respective idler wheel so that by axial displacement of the sliding sleeve it is possible to bring to positive fit one of the associated idler wheels.

The sliding wheel can be actuated by the respective actuating device which, for example, has a shift fork axially displaceable, via a shift rail, and on which is provided at least one connecting element for actuating the associated sliding sleeve. The connecting element can comprise, for example, three connecting rods which can be distributed on the periphery of the main shaft and then axially displace the associated sliding sleeve.

According to one other development, it is possible that each actuating device controls one actuating piston or the like which, for example, controls in axial direction, a shift plate so that the sliding sleeve is actuatable via the connecting element. A further saving of installation space can thereby advantageously be made possible.

In order that several sliding sleeves can be provided for shifting the idler wheels, the connecting rods provided as connecting elements are preferably uniformly distributed, for example, on the periphery of the main shaft. According to one development of this invention, the main shaft can have a spline section with which the sliding sleeves are non-rotatably connected with the main shaft. In this case, the connecting rods can be provided in the grooves of the spline section of the main shaft.

The inventive transmission shift system is of special advantage for 2-countershaft transmission, since here the width of the idler wheel support is of no importance.

BRIEF DESCRIPTION OF THE DRAWINGS

The invention is explained in detail herebelow with the aid of the enclosed drawings which show.

DETAILED DESCRIPTION OF THE INVENTION

Figure 1:
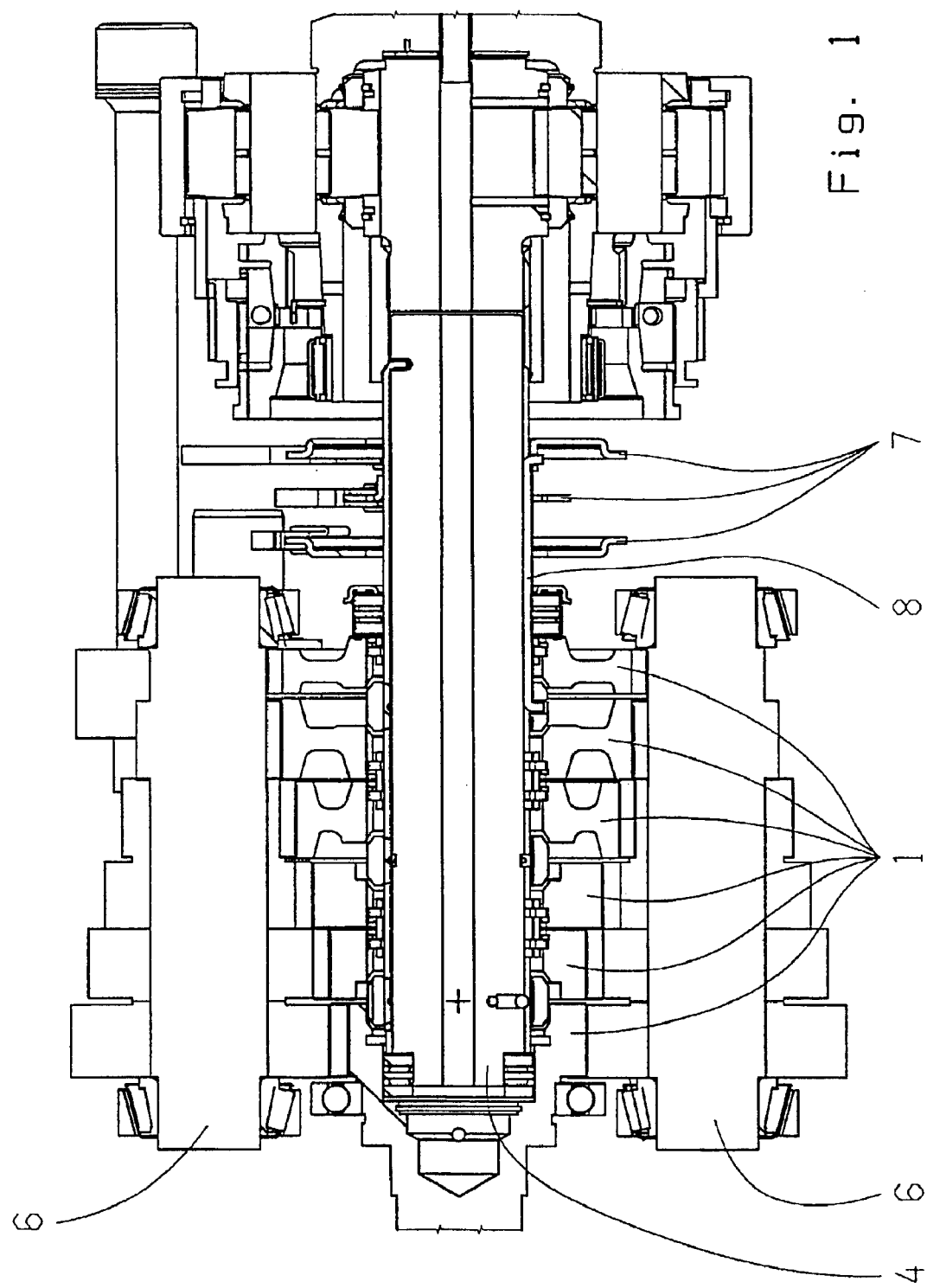
FIG. 1 is a cut partial view of an inventive transmission shift system.
Figure 2:
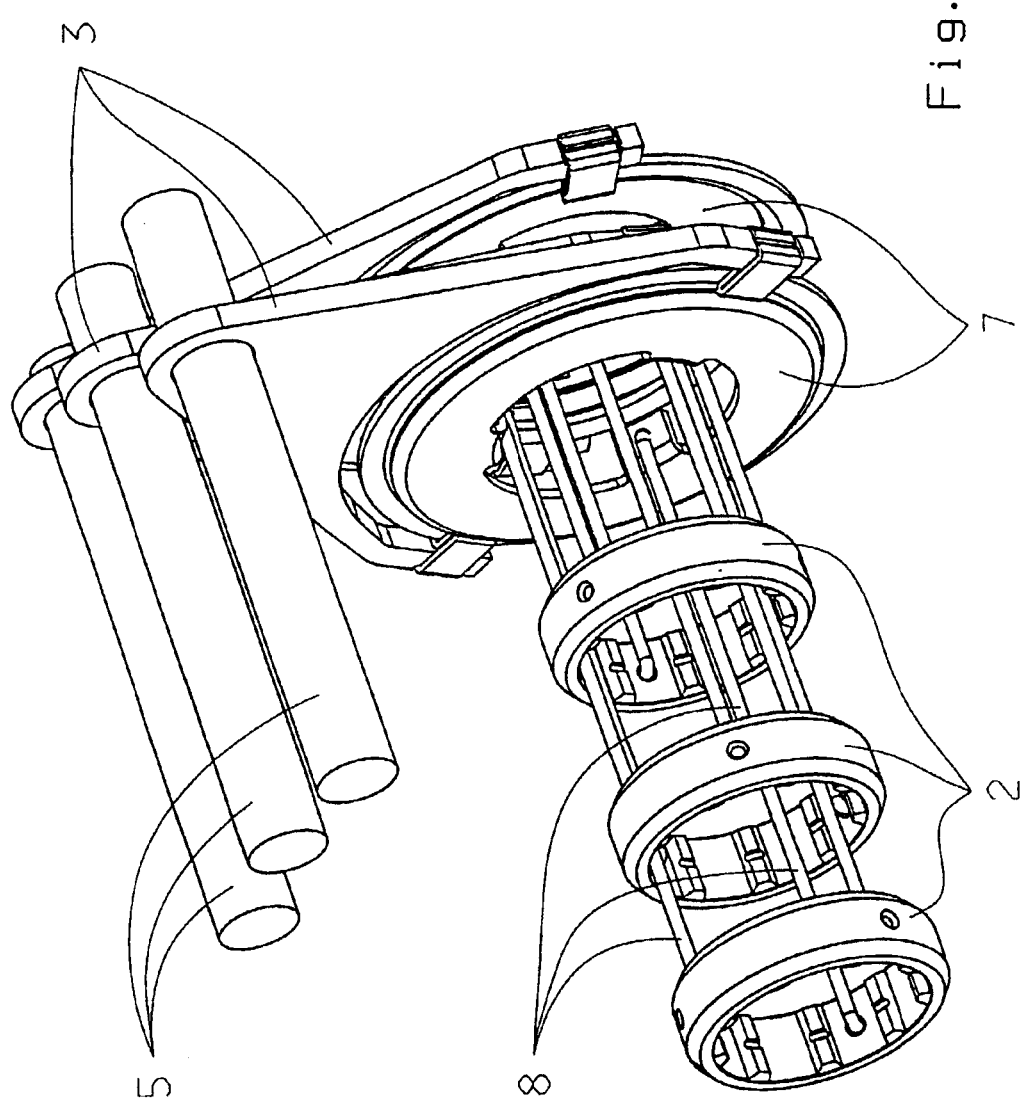
FIG. 2 is a three-dimensional view of several actuating devices with the appertaining sliding sleeves.
Figure 3:
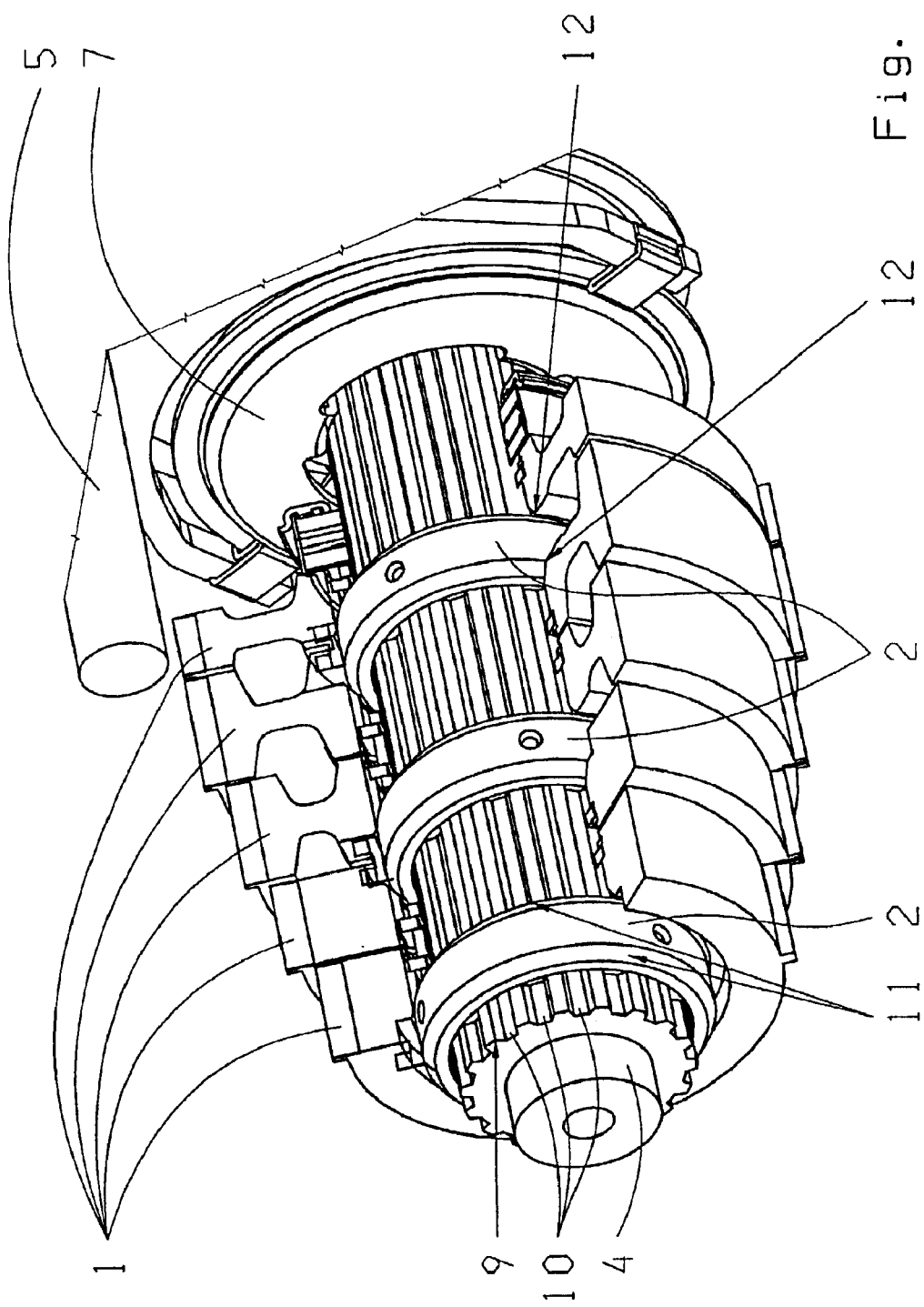
FIG. 3 is a perspective, partly cut partial view.

In FIGS. 1 to 3, a possible development of an inventive transmission shift system for a 2-countershaft transmission is shown, there being described only the parts essential to the invention. As to the reference numerals, the same reference numerals have been used for several identically developed parts.

The proposed transmission shift system for idler wheels 1 comprises several actuating devices with each of which a respective sliding sleeve is actuated. The sliding sleeves 2 are each non-rotatably connected with a main shaft 4. For this purpose, the main shaft 4 has, in correspondence with the sliding sleeves 2, a spline section 9 having suitable grooves 10.

In the development shown here, the sliding sleeves 2 are each associated with two idler wheels 1, the sliding sleeves 2 being each provided in one recess of the idler wheels 1 in a radial direction between the main shaft 4 and the associated idler wheels 1. By axial displacement along the main shaft 4, the sliding sleeve 2 concerned can be brought to fit positively with one of the idler wheels 1 to be shifted. To that end, the sliding sleeves 2 can each have, on the areas facing the idler wheel 1, an adequate spline 11 or the like. The idler wheels 1 likewise respectively have, on the areas facing the associated sliding sleeve 2, an adequate spline 12 which corresponds with the respective spline 11 of the sliding sleeve 2. In this manner, a positive fit between the idler wheel 1 and one associated sliding wheel 2 is made possible.

It is provided, according to the invention, that the shiftable idler wheels 1 be disposed upon the main shaft 4 directly juxtaposed in an axial direction and that the respective actuating devices are provided as a unit on the main shaft 4 outside the group of the idler wheels 1. In this manner, a space-saving arrangement is implemented whereby the total length of the transmission is reduced.

Each actuating device has one shift rail 5 which is connected with a shift fork 3. Each shift fork 3 comprises one annular shift plate 7 situated coaxially with the main shaft 4. As connecting element in each actuating device there are provided, in the grooves 10 of the spline section 9 along the main shaft 4, three connecting rods 8 which by one end is connected with the associated sliding sleeve 2 and by the other end with the associated shift plate 7. In order that several sliding sleeves 2 can be provided on the main shaft 4, the connecting rods 8 of all the sliding sleeves 2 are distributed about the periphery of the main shaft 4, as shown in FIG. 2.

In this manner, the associated sliding sleeve 2 can be axially displaced with the actuating device by the shift rail 5 axially displacing the shift fork 3 with the connecting rods 8.

The compact design of the inventive transmission shift system with the small installation space requirement resulting therefrom can be especially seen in FIG. 3.

The length of the proposed transmission shift system results from the width of the three shift forks, the shift stroke and the play between the idler wheels 1. The result in this case is a shortening of the length by substantially 18 mm.

This kind of transmission shift system is especially suitable for 2-countershaft transmissions, since here the width of the idler wheel support is unimportant.

REFERENCE NUMERALS 1 idler wheel
2 sliding sleeve
3 shift fork
4 main shaft
5 shift rails
6 countershaft
7 shift plate
8 connecting rods
9 spline section
10 groove
11 spline on sliding sleeve
12 spline on idler wheel

What is claimed is:

1. A transmission shift system for idler wheels, comprising a plurality of actuating devices which each actuates a respective sliding sleeve non-rotatably connected with a main shaft in order to bring the sliding sleeve (2) to positive fit with one of a plurality of idler wheels (1) to be shifted, wherein the shiftable idler wheels (1) are disposed upon the main shaft (4) directly juxtaposed in an axial direction, and the respective actuating devices are provided as a unit on the main shaft (4) axially outside the plurality of idler wheels (1); and each actuating device is connected with the respective sliding sleeve (2) via at least one connecting element extending along the main shaft (4).

2. The transmission shift system according to claim 1, wherein each of the sliding sleeves (2) is associated with at least one of the plurality of idler wheels (1), wherein each of the sliding sleeves (2) is provided in a radial direction between the main shaft (4) and the idler wheel (1) and, by axial displacement, can be brought to positive fit with the idler wheel to be shifted.

3. The transmission shift system according to claim 1, wherein the main shaft (4) has a spline section (9) corresponding with the sliding sleeves (2) so that the sliding sleeves (2) are non-rotatably connected with the main shaft (4).

4. The transmission shift system according to claim 1, wherein the at least one connecting element is a connecting rod (8) and is provided in predetermined grooves (10) of a spline section (9) of the main shaft (4).

5. The transmission shift system according to claim 1, wherein each actuating device has a shift fork (3) axially displaceable via a shift rail (5) and on which the at least one connecting element is provided for actuating the associated sliding sleeve (2).

6. The transmission shift system according to claim 5, wherein on the shift fork (3) is located a shift plate (7), which is connected with the connecting element.

7. The transmission shift system according to claim 6, wherein each actuating device has one actuating piston which displaces in an axial direction the shift plate (7) together with the associated sliding sleeve (2) to actuate the at least one connecting element.

8. The transmission shift system according to claim 5, wherein each connecting element is an axially displaceable connecting rod (8) which is connected at one end with the associated sliding sleeve (2) and at the other end with the associated shift plate (7).

9. The transmission shift system according to claim 8, wherein, to actuate the associated sliding sleeve (2), at least three connecting rods (8) are provided which are distributed about a periphery of said main shaft (4).

10. A transmission shift system for idler wheels comprising:
a main shaft non-rotatably connected with a plurality of actuatable sliding sleeves (2), the sliding sleeves (2) actuated by a respective actuating device having a shift fork (3) and a shift plate (7);
one of a plurality of shiftable idler wheels (1) to be shifted, in communication with one of the plurality of actuatable sliding sleeves (2), the plurality of shiftable idler wheels (1) are axially juxtaposed on the main shaft and directly adjacent each other; and
at least one connecting element extending along the main shaft (4) connects each respective actuating device and the one of the plurality of actuatable sliding sleeves (2), each actuating device is provided as a unit along the main, shaft (4) axially outside the plurality of the shiftable idler wheels (1).

11. A transmission shift system for idler wheels, comprising a plurality of actuating devices, each actuating device having a shift fork (3) and a shift plate (7), each actuating device actuates a respective sliding sleeve non-rotatably connected with a main shaft in order to bring the sliding sleeve (2) to positive fit with one of a plurality of idler wheels (1) to be shifted, wherein the shiftable idler wheels (1) are disposed upon the main shaft (4) directly juxtaposed in axial direction, and that respective actuating devices are provided as a unit on the main shaft (4) axially outside the plurality of idler wheels (1), each actuating device being connected with the respective sliding sleeve (2) via at least one connecting element extending along the main shaft (4); wherein the at least one connecting element is a connecting rod (8) and is provided in predetermined grooves (10) of a spline section (9) of the main shaft (4).

12. The transmission shift system according to claim 11, wherein the shift fork (3) of each actuating device is axially displaceable via a shift rail (5) and on which the at least one connecting element is provided for actuating the associated sliding sleeve (2).

13. The transmission shift system according to claim 11, wherein a shift plate (7) is located on the shift fork (3) and is connected with the connecting element.

14. The transmission shift system according to claim 11, wherein each sliding sleeve (2) is associated with at least one of the plurality of idler wheels (1), wherein the sliding sleeve (2) is provided in radial direction between he main shaft (4) and the idler wheel (1) and by axial displacement can be brought to positive fit with the idler wheel to be shifted.

15. The transmission shift system according to claim 14, wherein each connecting element is designed as an axially displaceable connecting rod (8) and is connected at one end with the associated sliding sleeve (2) and at another end with the associated shift plate (7).

16. The transmission shift system according to claim 11, wherein each actuating device has one actuating piston which displaces the shift plate (7) in an axial direction together with the associated sliding sleeve (2), the shift plate (7) communicating with the associated sliding sleeve (2) by means of the at least one connecting element.

17. The transmission shift system according to claim 16, wherein, at least three connecting rods (8) are provided to actuate the associated sliding sleeve (2) and are distributed on a periphery of said main shaft (4).

18. The transmission shift system according to claim 11, wherein the main shaft (4) has a spline section (9) corresponding with the sliding sleeves (2), to non-rotatably connect the sliding sleeves (2) with the main shaft (4).

19. The transmission shift system according to claim 18, wherein the connecting elements are connecting rods (8) which are provided in predetermined grooves (10) of the spline section (9) of the main shaft (4).

\* \* \* \* \*